United States Patent
Wasserblat et al.

(10) Patent No.: US 8,078,463 B2
(45) Date of Patent: Dec. 13, 2011

(54) METHOD AND APPARATUS FOR SPEAKER SPOTTING

(75) Inventors: Moshe Wasserblat, Modein (IL); Yaniv Zigel, Omer (IL); Oren Pereg, Zikhron Ya'akov (IL)

(73) Assignee: Nice Systems, Ltd., Ra'Anana (IL)

( * ) Notice: Subject to any disclaimer, the term of this patent is extended or adjusted under 35 U.S.C. 154(b) by 1449 days.

(21) Appl. No.: 10/996,811

(22) Filed: Nov. 23, 2004

(65) Prior Publication Data

US 2006/0111904 A1    May 25, 2006

(51) Int. Cl.
*G10L 17/00* (2006.01)

(52) U.S. Cl. .......... 704/246; 704/243; 704/245

(58) Field of Classification Search .......... 704/246, 704/275, 245, 250, 243, 239, 214, 247, 270.1, 704/249, 238, 240, 244; 382/224; 455/312
See application file for complete search history.

(56) References Cited

U.S. PATENT DOCUMENTS

| | | |
|---|---|---|
| 4,145,715 A | 3/1979 | Clever |
| 4,527,151 A | 7/1985 | Byrne |
| 4,821,118 A | 4/1989 | Lafreniere |
| 5,051,827 A | 9/1991 | Fairhurst |
| 5,091,780 A | 2/1992 | Pomerleau |
| 5,303,045 A | 4/1994 | Richards et al. |
| 5,307,170 A | 4/1994 | Itsumi et al. |
| 5,353,168 A | 10/1994 | Crick |
| 5,404,170 A | 4/1995 | Keating |
| 5,491,511 A | 2/1996 | Odle |
| 5,519,446 A | 5/1996 | Lee |
| 5,606,643 A * | 2/1997 | Balasubramanian et al. 704/243 |
| 5,678,221 A * | 10/1997 | Cahill .......... 455/312 |
| 5,734,441 A | 3/1998 | Kondo et al. |
| 5,742,349 A | 4/1998 | Choi et al. |
| 5,751,346 A | 5/1998 | Dozier et al. |
| 5,790,096 A | 8/1998 | Hill, Jr. |
| 5,796,439 A | 8/1998 | Hewett et al. |
| 5,847,755 A | 12/1998 | Wixson et al. |
| 5,895,453 A | 4/1999 | Cook |
| 5,920,338 A | 7/1999 | Katz |
| 6,014,647 A | 1/2000 | Nizzari et al. |
| 6,028,626 A | 2/2000 | Aviv |
| 6,031,573 A | 2/2000 | MacCormack et al. |
| 6,037,991 A | 3/2000 | Thro et al. |
| 6,070,142 A | 5/2000 | McDonough et al. |
| 6,073,101 A * | 6/2000 | Maes .......... 704/275 |
| 6,092,197 A | 7/2000 | Coueignoux |
| 6,094,227 A | 7/2000 | Guimier |
| 6,097,429 A | 8/2000 | Seeley et al. |

(Continued)

FOREIGN PATENT DOCUMENTS

GB    9916430.3    7/1999

(Continued)

OTHER PUBLICATIONS

U.S. Appl. No. 10/484,107, filed Jul. 2002, Freedman, et al.

(Continued)

*Primary Examiner* — Huyen X. Vo
(74) *Attorney, Agent, or Firm* — Ohlandt, Greeley, Ruggiero & Perle, LLP

(57) ABSTRACT

A method and apparatus for spotting a target speaker within a call interaction by generating speaker models based on one or more speaker's speech; and by searching for speaker models associated with one or more target speaker speech files.

38 Claims, 10 Drawing Sheets

U.S. PATENT DOCUMENTS

| | | | |
|---|---|---|---|
| 6,111,610 A | 8/2000 | Faroudja | |
| 6,134,530 A | 10/2000 | Bunting et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,182,037 B1 * | 1/2001 | Maes | 704/247 |
| 6,212,178 B1 | 4/2001 | Beck et al. | |
| 6,230,197 B1 | 5/2001 | Beck et al. | |
| 6,233,555 B1 * | 5/2001 | Parthasarathy et al. | 704/249 |
| 6,295,367 B1 | 9/2001 | Crabtree et al. | |
| 6,327,343 B1 | 12/2001 | Epstein et al. | |
| 6,330,025 B1 | 12/2001 | Arazi et al. | |
| 6,345,305 B1 | 2/2002 | Beck et al. | |
| 6,404,857 B1 | 6/2002 | Blair et al. | |
| 6,404,925 B1 * | 6/2002 | Foote et al. | 382/224 |
| 6,405,166 B1 * | 6/2002 | Huang et al. | 704/246 |
| 6,415,257 B1 * | 7/2002 | Junqua et al. | 704/275 |
| 6,427,137 B2 | 7/2002 | Petrushin | |
| 6,441,734 B1 | 8/2002 | Gutta et al. | |
| 6,529,871 B1 * | 3/2003 | Kanevsky et al. | 704/246 |
| 6,549,613 B1 | 4/2003 | Dikmen | |
| 6,553,217 B1 | 4/2003 | Kundorf | |
| 6,559,769 B2 | 5/2003 | Anthony et al. | |
| 6,570,608 B1 | 5/2003 | Tserng | |
| 6,604,108 B1 | 8/2003 | Nitahara | |
| 6,628,835 B1 | 9/2003 | Brill et al. | |
| 6,704,409 B1 | 3/2004 | Dilip et al. | |
| 6,748,356 B1 * | 6/2004 | Beigi et al. | 704/245 |
| 6,772,119 B2 * | 8/2004 | Chaudhari et al. | 704/246 |
| 7,016,844 B2 * | 3/2006 | Othmer et al. | 704/270.1 |
| 7,103,806 B1 | 9/2006 | Horvitz | |
| 7,243,062 B2 * | 7/2007 | Wark | 704/214 |
| 2001/0043697 A1 | 11/2001 | Cox et al. | |
| 2001/0052081 A1 | 12/2001 | McKibben et al. | |
| 2002/0010705 A1 | 1/2002 | Park et al. | |
| 2002/0059283 A1 | 5/2002 | Shapiro et al. | |
| 2002/0087385 A1 | 7/2002 | Vincent | |
| 2003/0059016 A1 | 3/2003 | Lieberman et al. | |
| 2003/0128099 A1 | 7/2003 | Cockerham | |
| 2004/0161133 A1 | 8/2004 | Elazar et al. | |
| 2006/0089837 A1 | 4/2006 | Adar et al. | |
| 2006/0093135 A1 | 5/2006 | Flatal et al. | |

FOREIGN PATENT DOCUMENTS

| | | |
|---|---|---|
| WO | WO 95 29470 A | 11/1995 |
| WO | WO 98 01838 A | 1/1998 |
| WO | 00/73996 | 12/2000 |
| WO | WO 03 013113 A2 | 2/2003 |
| WO | WO 03/067360 A2 | 8/2003 |
| WO | WO 03 067884 A1 | 8/2003 |

OTHER PUBLICATIONS

U.S. Appl. No. 10/362,096, filed Aug. 2001, Haynir, et al.
U.S. Appl. No. 10/469,550, filed Apr. 2001, Haynir, et al.
Aharonot, Y., "The Camera that Never Sleeps".
Chen, Q., et al., "A Data Warehouse/OLAP Framework for Scalable Telecommunication Tandem Traffic Analysis".
Dror, Y., "The Computer at the other end of the line" Ha'aretz, (Feb. 17, 2002).
NiceVision—Secure your Vision, a prospect by NICE Systems, Ltd., 7 pages total (2001).
NICE Systems announces New Aviation Security Initiative, reprinted from Security Technology & Design, 1 page (2001).
(Hebrew) "The Camera That Never Sleeps" from Yediot Aharonot, 1 page (2002).
Freedman, I. Closing the Contact Center Quality Loop with Customer Experience Management, Customer Interaction Solutions, vol. 19, No. 9, Mar. 2001, 2 pages total.
PR Newswire, NICE Redefines Customer Interactions with Launch of Customer Experience Management, Jun. 13, 2000, 2 pages total.
PR Newswire, Recognition Systems and Hyperion to Provide Closed Loop CRM Analytic Applications, Nov. 17, 1999 , 2 pages total.
Financial companies want to turn regulatory burden into competitive advantage, Feb. 24, 2003, printed from InformationWeek, http://www.informationweek.com/story/IWK20030223S0002, 4 pages total.
Sedor—Internet pages form http://www.dallmeier-electronic.com. 2 pages total (2003).
(Hebrew) print from Haaretz, "The Computer at the Other End of the Line", Feb. 17, 2002. 2 pages total.

* cited by examiner

METHOD AND APPARATUS FOR SPEAKER SPOTTING

BACKGROUND OF THE INVENTION

1. Field of the Invention

The present invention relates to speech processing systems in general and in particular to a method for automatic speaker spotting in order to search, to locate, to detect, and to a recognize a speech sample of a target speaker from among a collection of speech-based interactions carrying multiple speech samples of multiple interaction participants.

2. Discussion of the Related Art

Speaker spotting is an important task in speaker recognition and location applications. In a speaker spotting application a collection of multi-speaker phone calls is searched for the speech sample of a specific target speaker. Speaker spotting is useful in a number of environments, such as, for example, in a call-monitoring center where a large number of phone calls are captured and collected for each specific telephone line. Speaker spotting is further useful in a speech-based-interaction intensive environment, such as a financial institution, a government office, a software support center, and the like, where follow up is required for reasons of dispute resolution, agent performance monitoring, compliance regulations, and the like. However, it is typical to such environments that a target speaker for each specific interaction channel, such as a phone line participates in only a limited number of interactions, while other interactions carry the voices of other speakers. Thus, currently, in order to locate those interactions in which a specific target speaker participates and therefore those interactions that carry the speech sample thereof, a human listener, such as a supervisor, an auditor or security personnel who is tasked with the location of and the examination of the content of the speech of a target speaker, is usually obliged to listen to the entire set of recorded interactions.

There is a need for a speaker spotting method with the capabilities of scanning a large collection of speech-based interactions, such as phone calls and of the matching of the speech samples of a speaker carried by the interaction media to reference speech samples of the speaker, in order to locate the interaction carrying the speech of the target speaker and thereby to provide a human listener with the option of reducing the number of interaction he/she is obliged to listen to.

SUMMARY OF THE PRESENT INVENTION

One aspect of the present invention regards a method for spotting a target speaker. The method comprises generating a speaker model based on an at least one speaker speech, and searching for a speaker model associated with a target speaker speech.

A second aspect of the present invention regards a method for spotting a target speaker in order to enable users to select speech-based interactions imported from external or internal sources. The method comprises generating a speaker model based on a speech sample of a speaker; searching for a target speaker based on the speech characteristics of the target speaker and the speaker model associated with the target speaker.

In accordance with the aspects of the present invention there is provided a method for spotting a target speaker within at least one call interaction, the method comprising the steps of generating from a call interaction a speaker model of a speaker based on the speaker's speech sample; and searching for a target speaker using a speech sample of the said target speaker and the said speaker model. The step of generating comprises the step of obtaining a speaker speech sample from a multi-speaker speech database. The step of generating further comprises the steps of pre-processing the speaker speech sample; and extracting one or more feature vectors from the speaker speech sample. The step of generating further comprises the step of estimating a speaker model based on the one or more extracted feature vector. The step of generating further comprises storing the speaker model with additional speaker data in a speaker model database. The additional speaker data comprises a pointer to speaker speech sample or at least a portion of the speaker speech sample. The step of searching comprises obtaining the said target speaker speech sample from a speech capture device or from a pre-stored speech recording. The step of searching further comprises pre-processing the said target speaker speech sample; and extracting one or more feature vector from the target speaker speech sample. The step of searching further comprises calculating probabilistic scores, indicating the matching of the target speaker speech sample with the speaker model. The step of searching further comprises inserting the target speaker speech into a sorted calls data structure.

In accordance with the aspects of the invention there is provided a method for spotting a target speaker, the method comprising the steps of generating one or more speaker models based on one or more speaker's speech; and searching for one or more speaker model associated with one or more target speaker speech files. The step of generating comprises obtaining a speaker speech sample from a multi-speaker database and pre-processing the speaker speech sample; and extracting one or more features vector from the at least one speaker speech sample. The step of generating also comprises the step of estimating one speaker model based on the at least one extracted feature vector. The step of generating further comprises storing the speaker model with the associated speech sample and additional speaker data in a speaker model database.

The step of searching comprises obtaining a target speaker speech sample from a speech capture device or from a pre-stored speech recording, pre-processing the target speaker speech sample; and extracting one or more feature vector from the target speaker speech sample. The step of searching further comprises calculating probabilistic scores and matching the target speaker speech with a speaker model in a speaker models database; and performing score alignment. The step of searching further comprises indexing and sorting the target speaker speech and inserting the target speaker speech into a sorted calls data structure. The step of searching further comprises fast searching of the speaker model database via a search filter and testing the quality of one or more frames containing one or more feature vectors. The method further comprises obtaining a threshold value indicating the number of calls to be monitored; and handling the number of calls to be monitored in accordance with the numbers of calls to be monitored threshold value.

In accordance with another the aspects of the invention there is provided a method for spotting a target speaker in order to enable users to select speech-based interactions imported from external or internal sources, the method comprising generating a speaker model based on a speech sample of a speaker; searching for a target speaker based on the speech characteristics of the target speaker and the speaker model associated with the target speaker; extracting speech characteristics of a speech sample associated with a target speaker. The spotting of the target speaker is performed offline or online. The method further comprises recording automatically speech-based interactions associated with one or more target speakers based on the characteristics of the target speaker. The method further comprises preventing the recording of speech-based interactions associated with the target speaker based on the characteristics of the target speaker and disguising the identity of a target speaker by distorting the speech pattern. The method further comprises online or offline fraud detection by comparing characteristics of the target speaker along the time axis of the interactions. The method further comprises activating an alarm or indicating a pre-determined event or activity associated with a target speaker. The method further comprises finding historical speech-based interactions associated with a target speaker and extracting useful information from the interaction.

In accordance with the aspects of the invention there is provided an apparatus for spotting a target speaker, the apparatus comprising a training component to generate a speaker model based on speaker speech; and a speaker spotting component to match a speaker model to target speaker speech. The apparatus further comprises a speaker model storage component to store the speaker model based on the speaker speech. The training component comprises a speaker speech pre-processor module to pre-process a speaker speech sample and a speech feature vectors extraction module to extract a speech feature vector from the pre-processed speaker speech sample. The training component can also comprise a speaker model estimation module to generate reference speaker model based on and associated with the extracted speech feature vector; and a speaker models database to store generated speaker model associated with the speaker speech. The speaker model database comprises a speaker model to store the feature probability density function parameters associated with a speaker speech; a speaker speech sample associated with speaker model; and additional speaker information for storing speaker data. The speaker model storage component can comprise a speaker model database to hold one or more speaker models. The speaker spotting component further comprises a target speaker speech feature vectors extraction module to extract target speaker speech feature vector from the pre-processed target speaker speech sample. The speaker spotting component further comprises a score calculation component to score target speaker speech to match the target speaker speech to speaker model.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

Figure 1:
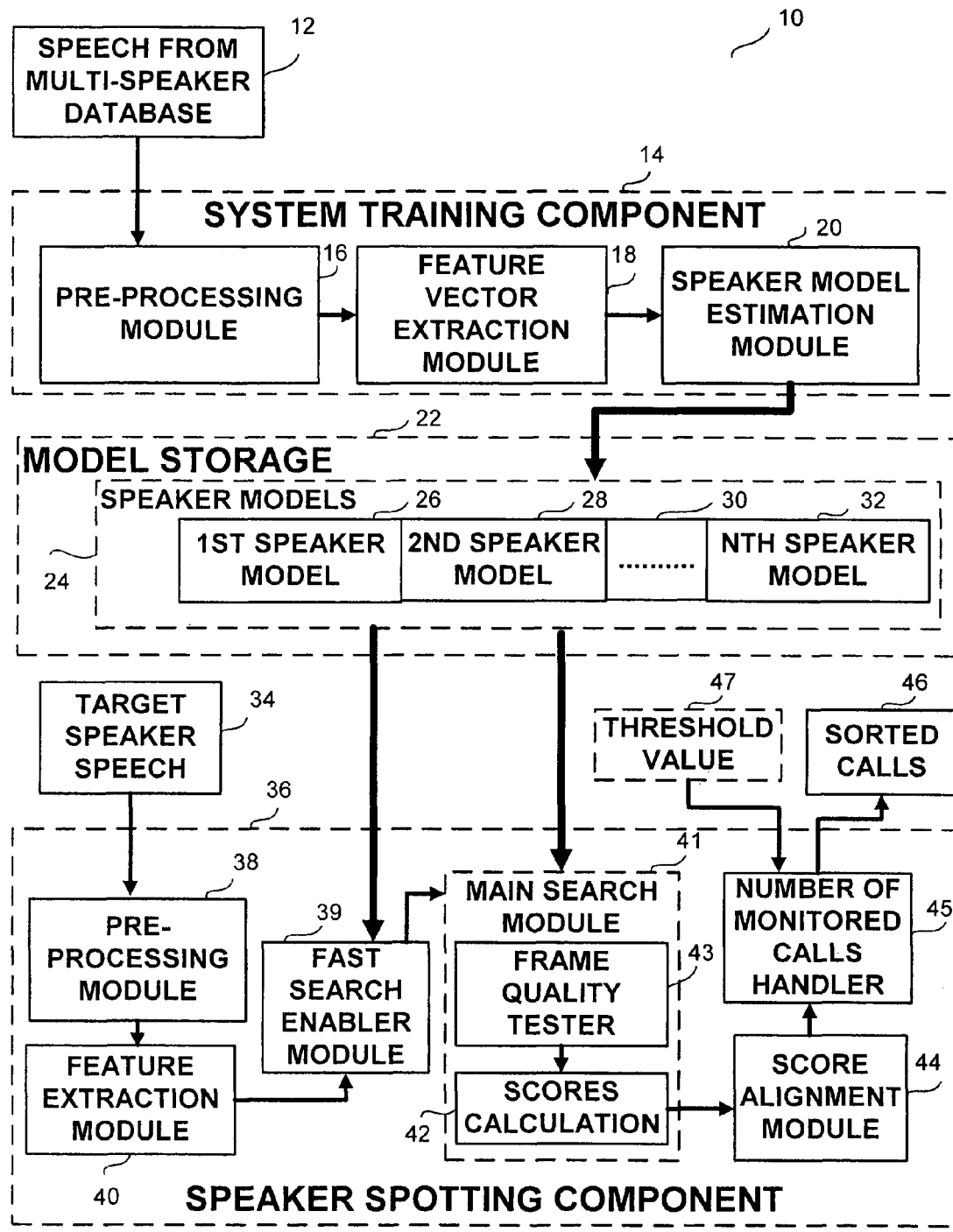
FIG. 1 is a schematic block diagram of the speaker spotting system, in accordance with a preferred embodiment of the present invention.

A method and apparatus for speaker spotting is disclosed. The speaker spotting method is capable of probabilistically matching an at least one speech sample of an at least one target speaker, such as an individual participating in an at least one a speech-based interaction, such as a phone call, or a teleconference or speech embodied within other media comprising voices, to a previously generated estimated speaker speech model record. In accordance with the measure of similarity between the target speaker speech sample characteristics and the characteristics constituting the estimated speaker model the phone call carrying the target speaker speech sample is given a probabilistic score. Indexed or sorted by the given score value, the call carrying the target speaker speech sample is stored for later use. The proposed speaker spotting system is based on classifiers, such as, for example, the Gaussian Mixture Models (GMM). The proposed speaker spotting system is designed for text-independent speech recognition of is speakers. Gaussian Mixture Models are a type of density model which comprise a number of component functions where these functions are Gaussian functions and are combined to provide a multimodal density. The use of GMM for speaker identification improves processing performance when compared to several existing techniques. Text independent systems can make use of different utterances for test and training and rely on long-term statistical characteristics of speech for making a successful identification. The models created by the speaker spotting apparatus are stored and when a speaker's speech is searched for the search is conducted on the models stored. The models preferably store only the statistically dominant characteristics of the speaker based on the GMM results FIG. 1 shows a speaker spotting system 10 in accordance with the preferred embodiment of the present invention. The speaker spotting system includes a system training component 14, a speaker spotting component 36 and a speaker model storage component 22. The system training component 14 acquires samples of pre-recorded speakers' voices from a multi-speaker database 12 that stores the recordings of a plurality of speech-based interactions, such as phone calls, representing speech-based interactions among interaction participants where each phone call carries the speech of one or more participants or speakers. The multi-speaker database 12 could also be referred to as the system training database. The analog or digital signals representing the samples of the speaker speech are pre-processed by a pre-processing method segment 16 and the speech features are extracted in a speech feature vector extraction method segment 18. A summed calls handler (not shown) is optionally operated in order to find automatically the number of speakers summed in the call and if more than one speaker exists, speech call segmentation and speaker separation is performed in order to separate each speaker speech. This summed calls handler has the option to get the information concerning the number of speakers manually. The feature vectors associated with a specific speaker's speech sample are utilized to estimate of a speaker model record representing the speaker speech sample. The speaker model estimation is performed in a speaker model estimation method segment 20. During the operation of the speaker module storage component 22 the speaker model records in conjunction with the associated speech sample portions are stored in a speaker model database referred to as the speaker models 24. The speaker models data structure 24 stores one or more speaker models, such as the first speaker model 26, the second speaker model 28, the Nth speaker model 32, and the like. The speaker spotting component 36 is responsible for obtaining the speech sample of a target speaker 34 either in real-time where the speech sample is captured by speech input device, such as a microphone embedded in a telephone hand set, or off-line where the speech sample is extracted from a previously captured and recorded call record. Speech samples could be captured or recorded either in analog or in digital format. In order to affect efficient processing analog speech signals are typically converted to digital format prior to the operation of the speaker system training component 14 or the operation of the speaker spotting component 36. In the subsystem spotting stage the obtained speech sample undergoes pre-processing in a pre-processing method segment 38 and feature extraction in a feature extraction method segment 40. A summed calls handler (not shown) is optionally operated in order to find automatically the number of speakers summed into a summed record in this call and if more than one speaker exists, speech call segmentation and separation is made in order to separate each speaker speech. A fast search enabler module 39 is coupled to the speaker models 24. Module 39 includes a fast search filter. A main search module 41 coupled to the speaker models 24 includes a frame quality tester 43 and a scores calculator 42. A pattern-matching scheme is used to calculate probabilistic scores that indicate the matching of the tested target speaker speech sample with the speaker models 26, 28, 30, 32 in the models storage data structure 24. The pattern matching is performed via the scores calculator 42. The main search module 41 in association with the fast search enabler module 39 is responsible for the filtering of the speaker models 24 obtained from the model storage 22 in order to perform a faster search. The function of the frame quality tester 43 is to examine the speech frames or the feature vectors and to score each feature vector frame. If the score is below or above a pre-determined or automatically calculated score threshold value then the frame is eliminated. In addition if the frame quality tester 43 will recognize noises within a feature vector frame then the noisy frame will be eliminated. Alternatively, the frames are not eliminated but could be kept and could be given another score value. The scores calculator 42 performs either a summation of the scoring or a combination of the scoring and calculates a score number to be used for score alignment. The score alignment is performed by the score alignment method module 44. Optionally, the top scores are checked against a pre-determined score threshold value 47. Where the score value is greater than the score threshold value then the system will generate information about the specific target speaker of the speaker model that is responsible for the score value. In contrast, if the score is not greater than the threshold value the system outputs an "unknown speaker" indicator. This pre-determined threshold can be tuned in order to set the working point, which relates to the overall ratio between the false accept and false reject errors. All the phone calls containing the scored speaker speech samples are sorted in accordance with the value of the scores and the calls are stored in a sorted call data structure 46. The data structure 46 provides the option for a human listener to select a limited number of calls for listening where the selection is typically performed in accordance with the value of the scores. Thus, in order to locate a specifically target speaker, phone calls indicated with the topmost scores are selected for listening.

Figure 2:
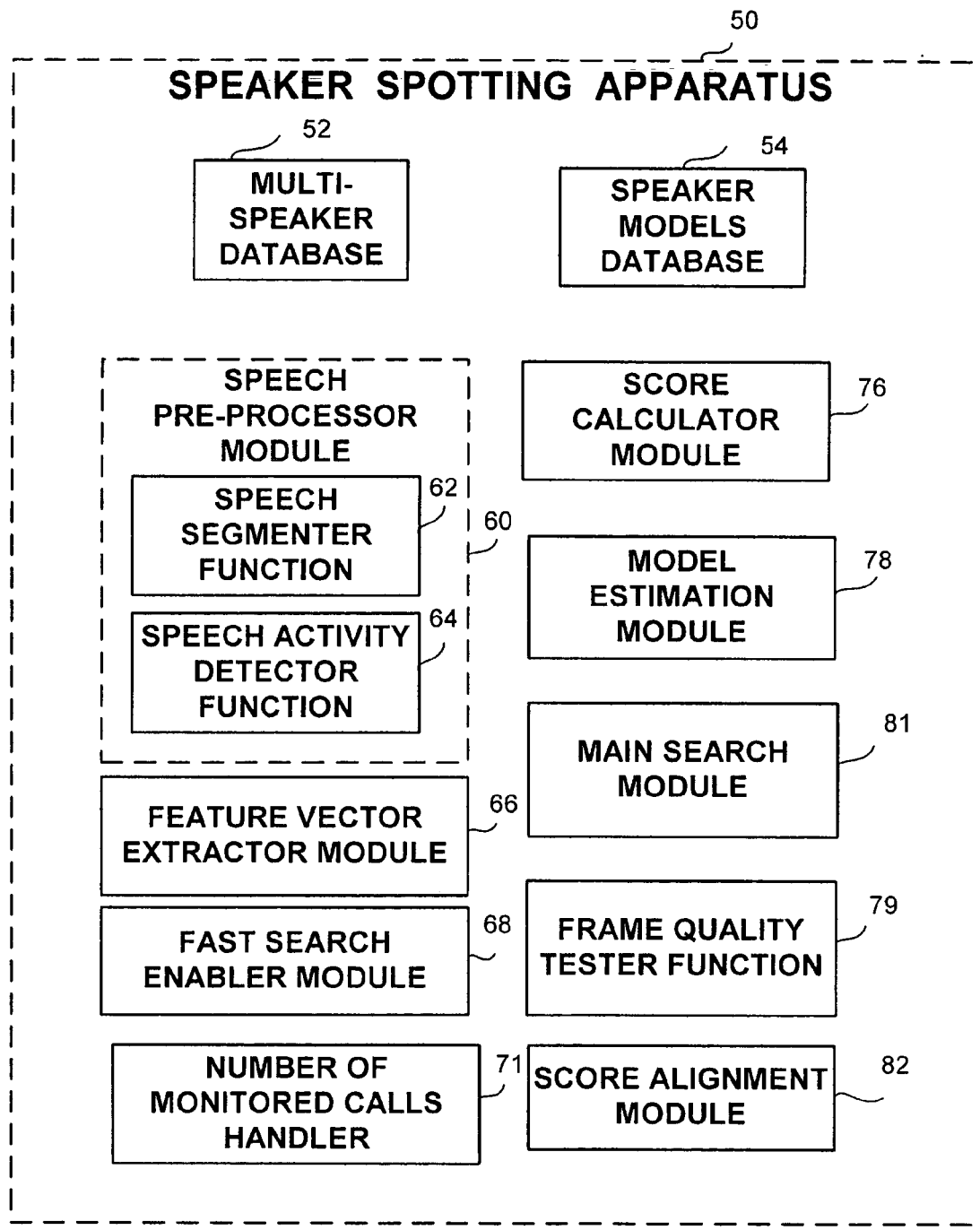
FIG. 2 is a schematic block diagram describing a set of software components and associated data structures of the speaker spotting apparatus, in accordance with a preferred embodiment of the present invention.

Referring now to FIG. 2 the speaker spotting apparatus 50 includes a logically related group of computer programs and several associated data structures. The programs and associated data structures provide for system training, for the storage and the extraction of data concerning the speaker spotting system, and the like, and for the matching of target speaker speech against the speaker models generated in the training stage in order to identify a target speaker speech and associate the target speaker speech with pre-stored speaker information. The data structures include a multi-speaker database 52, a speaker models database 54, and a sorted calls data structure. The computer programs include a speech pre-processor module 60, a feature vector extractor module 66, a fast search enabler module 68, a number of monitored calls handler 71, a score calculator module 76, a model estimation module 78, a score alignment module 82, a main search module 81, and a frame quality tester function 79. The multi-speaker database 52 is a computer-readable data structure that stores the recordings of monitored speech-based interactions, such as phone calls, and the like. The recorded phone calls represent real-life speech-based interactions, such as business negotiations, financial transactions, customer support sessions, sales initiatives, and the like, that carry the voices of two or more speakers or phone-call participants. The speaker model database 54 is a computer-readable data structure that stores the estimated speaker models and stores additional speaker data. The additional speaker data includes an at least one pointer to the speaker speech sample or to a portion of the speaker speech sample. The speaker models are a set of parameters that represent the density of the speech feature vector values extracted from and based on the distinct participant voices stored in the multi-speaker database 52. The speaker models are created by the system training component 14 of FIG. 1 following the pre-processing of the voices from the multi-speaker database 42, the extraction of the feature vectors and the estimation of the speaker models. The sorted calls data structure includes the suitably indexed, sorted and aligned interaction recordings, such as phone calls, and the like obtained from the multi-speaker database 52 consequent to the statistical scoring of the calls regarding the similarity of the feature vectors extracted from the speaker's speech to the feature vectors constituting the speaker model representing reference feature vectors from the speaker models database 54. The speech pre-processor module 60 is computer program that is responsible for the pre-processing of the speech samples from the call records obtained from the multi-speaker database 52 in the system training phase 14 of FIG. 1 and for the pre-processing of the target speaker speech 35 in the speaker spotting stage 36 of FIG. 1. Pre-processing module 60 includes a speech segmenter function 62 and a speech activity detector sub-module 64. Feature vector extractor module 66 extracts the feature vectors from the speech frames. The model estimation module 78 is responsible for the generation of the speaker model during the operation of the system training component 14 of FIG. 1. The fast search enabler module 68 includes a search filter. Module 68 is responsible for filtering the speaker models from the model storage 22 in order to provide for faster processing. Number of monitored calls handler 71 is responsible to handle a pre-defined number of calls where the number of calls is based on a specific threshold value 47 of FIG. 1. Main search module 81 is responsible for the selective sorting of the speaker models. Frame quality tester function 79 is responsible for examining the frames associated with the feature vector and determines in accordance with pre-defined or automatically calculated threshold values whether to eliminate certain frames from further processing. The score alignment component 82 is responsible for the alignment of the scores during the operation of the speaker spotting component 36. A summed calls handler (not shown) is optionally operated in order to find automatically the number of speakers in this call and if more than one speaker exists, speech call segmentation and separation is made in order to separate each speaker speech. This summed calls handler has the option to get the information on the number of speakers manually. Summed calls are calls provided in summed channel form. At times, conversational speech is available only in summed channel form, rather than separated channels, such as two one-sided channels form. In the said summed calls, ordinarily, more than one speaker speech exists in this speech signal. Moreover, even in one-sided calls, sometimes, more than one speaker exists, due to handset transmission or extension transmission. In order to make a reliable speaker spotting, one has to separate each speaker speech.

Figure 3:
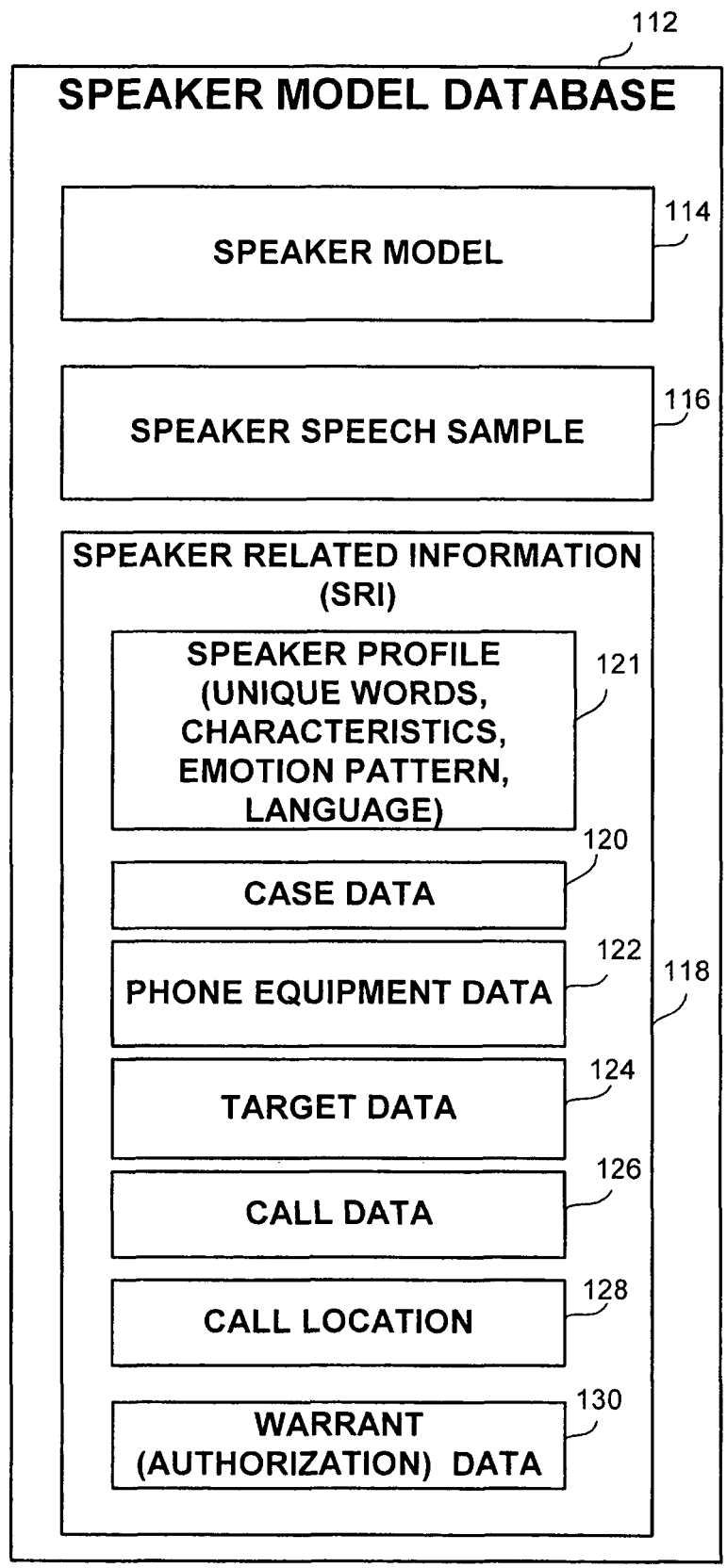
FIG. 3 is a schematic block diagram of a structure of the speaker model database, in accordance with a preferred embodiment of the present invention.

Referring now to FIG. 3 the exemplary speaker model database 112 includes one or more records associated with one or more estimated speaker models. A typical speaker model database record could include a speaker model 114, a speaker speech sample 116, and additional speaker related information (SRI) 118. The speaker model 114 includes feature vectors characteristic to a specific speaker speech. The speaker speech sample 116 includes the speech sample from which the speaker model was generated. The SRI 118 could include speaker-specific information, such as a speaker profile 121, case data 120, phone equipment data 122, target data 124, call data 126, call location 128, and warrant data 130. The speaker model 114 is the estimated model of a speaker's speech and includes the relevant characteristics of the speech, such as the extracted and processed feature vectors. The speaker model 114 is generated during the system training stage 14 of FIG. 1. The speaker speech sample 116 stores a sample of the speaker speech that is associated with the speaker model 114. The record in the speaker model database 112 further includes additional speaker related information (SRI) 118. The SRI 118 could include a speaker profile 121, case data 120, phone equipment data 122, target data 124, call data 126, call location 128, and warrant (authorization) data 130. The speaker profile 121 could unique words used by the speaker, speaker voice characteristics, emotion pattern, language, and the like. The case data 120 could include transaction identifiers, transaction types, account numbers, and the like. The equipment data 122 could include phone numbers, area codes, network types, and the like. Note should be taken that the SRI could include additional information.

Figure 4:
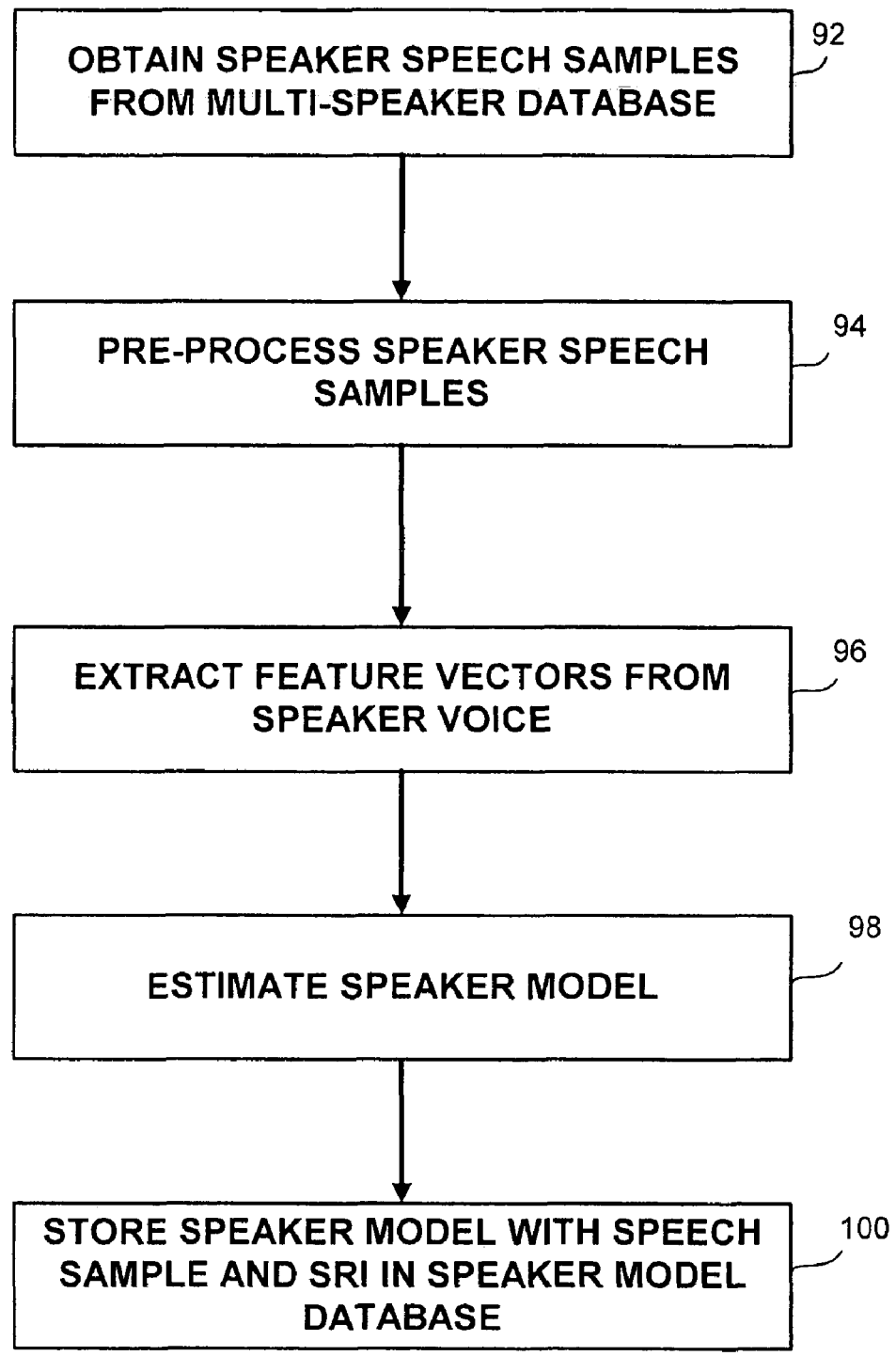
FIG. 4 is a simplified flowchart describing the execution steps of the system training stage of the speaker spotting method, in accordance with a preferred embodiment of the present invention.

Referring now to FIG. 4 that shows the steps performed by the system training component during the system training stage of the speaker spotting system. During the operation of the system training component 14 of FIG. 1 a pre-recorded multi-speaker database storing recordings of speech-based call interactions is scanned in order to extract the call records constituting the database. The speaker speech samples within the phone call records are processed in order to generate estimated speaker speech models associated with the speaker speech samples in the call records. The speaker speech models are generated in order to be utilized consequently in the later stages of the speaker spotting system as reference records to be matched with the relevant characteristics of the target speaker speech samples in order to locate a target speaker. Next, the exemplary execution steps of the system training stage are going to be described. At step 92 a speech signal representing a speaker's speech sample is obtained from the multi-speaker database 52 of FIG. 2. At step 94 the signal representing the speaker's speech sample is pre-processed by the speech preprocessor module 60 of FIG. 2. Step 94 is divided into several sub-steps (not shown). In the first sub-step the speech sample is segmented into speech frames by an about 20-ms window progressing at an about 10-ms frame rate. The segmentation is performed by the speech segmenter sub-module 62 of FIG. 2. In the second sub-step the speech activity detector sub-module 64 of FIG. 2 is used to discard frames that include silence and frames that include noise. The speech activity detector sub-module 64 of FIG. 2 is a self-normalizing, energy-based detector. At step 96 the MFCC (Mel Frequency Cepstral Coefficients) feature vectors are extracted from the speech frames. The MFCC is the discrete cosine transform of the log-spectral energies of the speech segment. The spectral energies are calculated over log-arithmetically spaced filters with increased bandwidths also referred to as mel-filters. All the cepstral coefficients except having zero value (the DC level of the log-spectral energies) are retained in the processing. Then DMFCC (Delta Cepstra Mel Frequency Cepstral Coefficients) are computed using a first order orthogonal polynomial temporal fit over at least +-two feature vectors (at least two to the left and at least two to the right over time) from the current vector. The feature vectors are channel normalized to remove linear channel convolution effects. Subsequent to the utilization of Cepstral features, linear convolution effects appear as additive biases. Cepstral mean subtraction (CMS) is used. A summed calls handler (not shown) is optionally operated in order to find automatically the number of speakers in this call and if more than one speaker exists, speech call segmentation and separation is made in order to separate each speaker speech. This summed calls handler has the option to get the information on the number of speakers manually. At step 98 the speaker model is estimated and at step 100 the speaker model with the associated speech sample and other speaker related information is stored in the speaker model database 72 of FIG. 2. The use of the term estimated speaker model is made to specifically point out that the estimated speech model received is an array of values of features extracted from the speaker voice during the performance of step 96 described above. In the preferred embodiment, the estimated speaker model comprises an array of parameters that represent the Probability Density Function (PDF) of the specific speaker feature vectors. When using Gaussian Mixture Models (GMM) for modeling the PDF, the parameters are: Gaussians average vectors, co-variance matrices and the weight of each Gaussian. Thus, when using the GMM, rather than storing the speaker voice or elements of the speaker voice, the present invention provides for the generation of estimated speaker model based on computational results of extracted feature vectors which represent only the statistically dominant characteristics of the speaker based on the GMM results Note should be taken that the use of the MFCC features and the associated DMFCC features for the method of calculation of the spectral energies of the speech segment is exemplary only. In other preferred embodiment of the present invention, other types of spectral energy transform and associated computations could be used.

Figure 5:
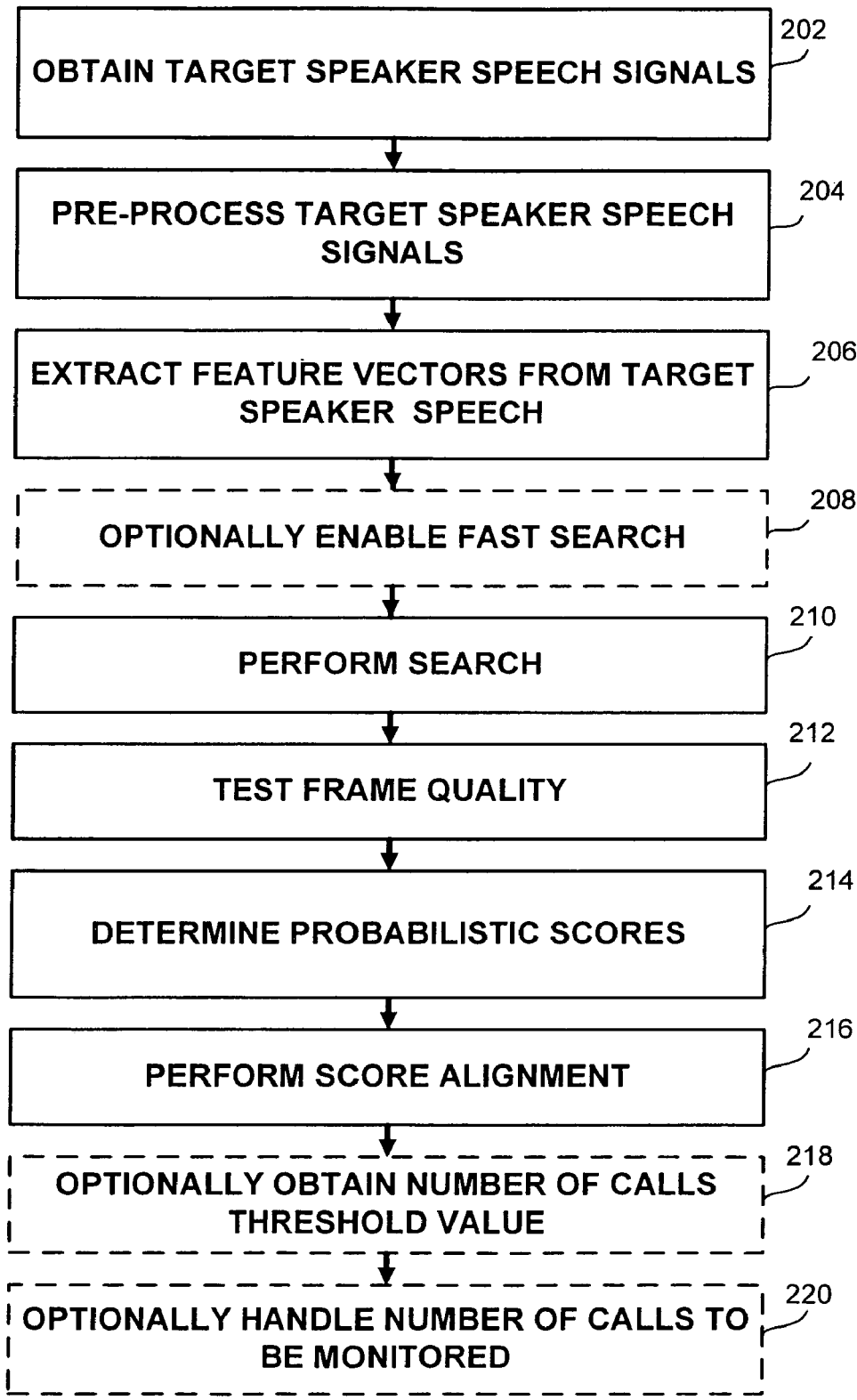
FIG. 5 is a simplified flowchart describing the execution steps of the detection stage of the speaker spotting method, in accordance with a preferred embodiment of the present invention.

Referring now to FIG. 5 that shows the steps performed during the operation of the speaker spotting component 36 of FIG. 1. During the operation of the speaker spotting component a target speaker speech is obtained either in a real-time mode from a speech capture device, such as a microphone of a telephone hand set or in an offline mode from a pre-stored speech recording. The obtained speaker speech is processed in order to attempt and match the speaker speech to one of the estimated speaker models in the speaker models database 112 of FIG. 3. The speaker model 114 is used as speaker speech reference to the target speaker speech 34 of FIG. 1. Next, the exemplary execution steps associated with the program instructions of the speaker spotting component are going to be described. At step 202 a speech signal representing a target speaker speech is obtained either directly from a speech capture device, such as a microphone or from a speech storage device holding a previously recorded speaker speech. In a manner similar to the pre-processing performed during the operation of the system training component at step 204 the signal representing the speaker's speech sample is pre-processed by the speech preprocessor module 60 of FIG. 2. Step 204 is divided into several sub-steps (not shown). In the first sub-step the speech sample is segmented into speech frames by an about 20-ms window progressing at an about 10-ms frame rate. The segmentation is performed by the speech segmenter sub-module 62 of FIG. 2. In the second sub-step the speech activity detector sub-module 64 of FIG. 2 is used to discard frames that include silence and frames that include noise. The speech activity detector sub-module 64 of FIG. 2 could be a self-normalizing, energy-based detector. At step 206 the MFCC (Mel Frequency Cepstral Coefficients) feature vectors are extracted from the speech frames. Then DMFCC (Delta Cepstral Mel Frequency Cepstral Coefficients) are computed using a first order orthogonal polynomial temporal fit over at least +-two feature vectors (at least two to the left and at least two to the right over time) from the current vector. The feature vectors are channel normalized to remove linear channel convolution effects. Subsequent to the utilization of Cepstral features, linear convolution effects appear as additive biases. Cepstral mean subtraction (CMS) is used. A summed calls handler (not shown) is optionally operated in order to find automatically the number of speakers in this call and if more than one speaker exists, speech call segmentation and separation is made in order to separate each speaker speech. This summed calls handler has the option to obtain the information on the number of speakers manually. At step 208 fast searches is enabled optionally. At step 210 a search is performed and at step 212 the quality of the vector feature frames is tested for out-of-threshold values and noise. At step 214 the target speaker speech is matched to one of the speaker models on the speaker models database 54 of FIG. 2 by the calculation of probabilistic scores for the target speaker speech with the speaker model. At step 216 score alignment is performed and subsequently the call including the scored speaker speech is inserted into the sorted calls data structure. Optionally, at step 218 a number of calls to be monitored threshold value is obtained and at step 220 the number of calls to be monitored are handled in accordance with the threshold values obtained at step 218. Note should be taken that the use of the MFCC features and the associated DMFCC features for the method of calculation of the spectral energies of the speech segment is exemplary only. In other preferred embodiment of the present invention, other types of spectral energy transform and associated computations could be used.

Still referring to FIG. 5 the target speaker speech is the speech sample of a speaker that is searched for by the speaker spotting system. The speaker spotting phase of the operation is performed by the speaker spotting component. The feature vector values of the speaker speech are compared to the speaker models stored in the speaker models database. The measure of the similarity is determined by a specific predetermined threshold value associated with the system control parameters. When the result of the comparison exceeds the threshold value it is determined that a match was achieved and the target speaker speech is associated with a record in the speaker models database. Since the speaker model is linked to additional speaker information the matching of a target speaker speech with a speaker model effectively identifies a speaker via the speaker related information fields.

The speaker spotting apparatus and method includes a number of features that are integral to the present invention. The additional features include a) discarding problematic speech frames by a module of the quality tester consequent to the testing of quality of the frames containing the feature vectors, b) fast searching of the speaker speech models, and c) recommendation of the number of calls to be monitored.

Problematic speech frames exist due to new phonetic utterances of speech events, such as laughter. The present invention includes an original method for discarding such problematic speech frames. The methods take into consideration only the highest temporal scores in the utterance for the score calculation. Occasionally, the searching process may take time, especially when the number of speaker models in the speaker models database is extremely large. The present invention includes a fast search method where an initial search is performed on a small portion of the reference speech file in order to remove many of the tested models. Consequently, a main search is performed on the remaining reduced number of models. The system can dynamically recommend the number of speech-based interactions, such as calls captured in real-time or pre-recorded calls to be monitored. The determination of the number of outputs is made using a unique score normalization technique and a score decision threshold.

The proposed speaker spotting method provides several useful features and options for the system within which the proposed method operates. Thus, the method could operate in an "offline mode" that will enable users to select speech-based interactions imported from external or internal sources in order to generate a speaker model or to extract a speaker profile (such as unique words) or to search for a target speaker in the databases, loggers, tapes and storage centers associated with the system. The proposed method could further operate in an "online mode" that will enable users to monitor synchronously with the performance of the interaction the participants of the interaction or to locate the prior interactions of the participants in a pre-generated database. In the "online mode" the method could also generate a speaker model based on the speech characteristics of the target speaker. Additional options provided by the proposed method include Recording-on-Demand, Masking-on-Demand, Disguising-on-Demand, Fraud Detection, Security Notification, and Advanced User Query. The Masking-on-Demand feature provides the option of masking a previously recorded speech-based interaction or interactions or portions of an interaction in which that a specific target speaker or specific speakers or a specific group of speakers or a speaker type having pre-defined attributes (gender, age group or the like) participate in. The Disguise-on-Demand feature provides the option to an online or offline speaker spotting system to disguising the identity of a specific speaker, speakers or group of speakers by distorting the speech of the recorded speaker. Fraud Detection enables an online or offline speaker spotting system to detect a fraud. Security Notification enables and online or an offline speaker spotting system to activate an alarm or provide indications in response to a pre-defined event or activity associated with a target speaker. Advanced User Query provides the option of locating or finding historical interactions associated with a target speaker and allows the extraction of information there from. The Advanced User Query further comprises displaying historical speech-based interactions associated with a target speaker along with the said extracted information.

Figure 6:
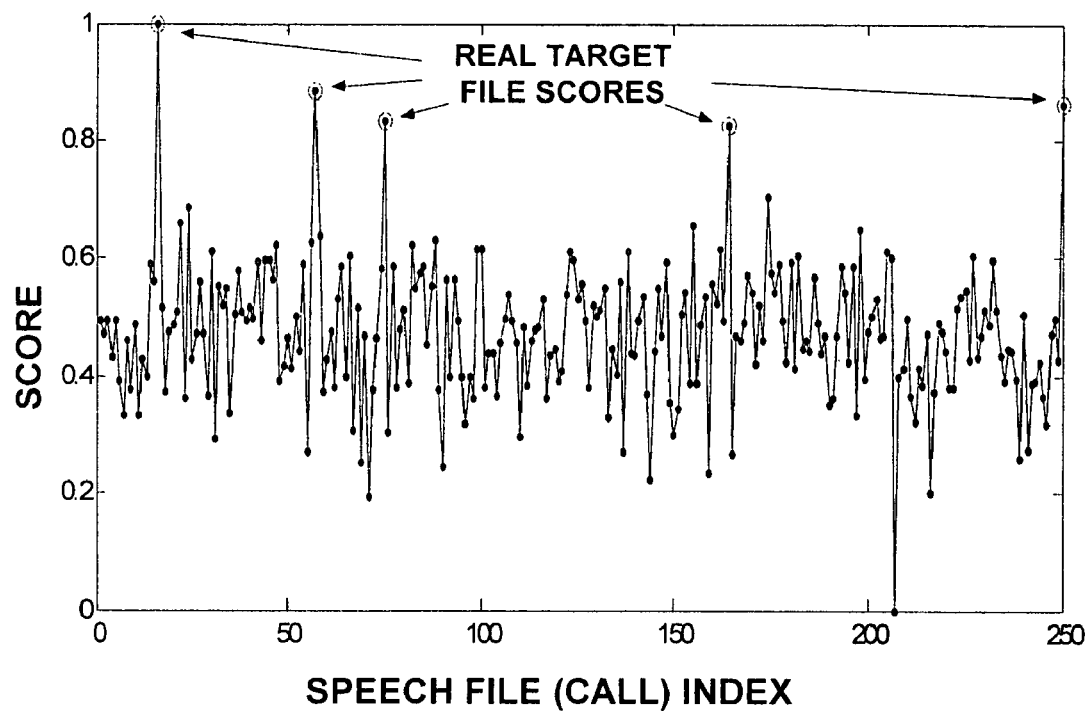
FIG. 6 shows a random call selection distribution graph during the Speaker Spotting Experiment.
Figure 7:
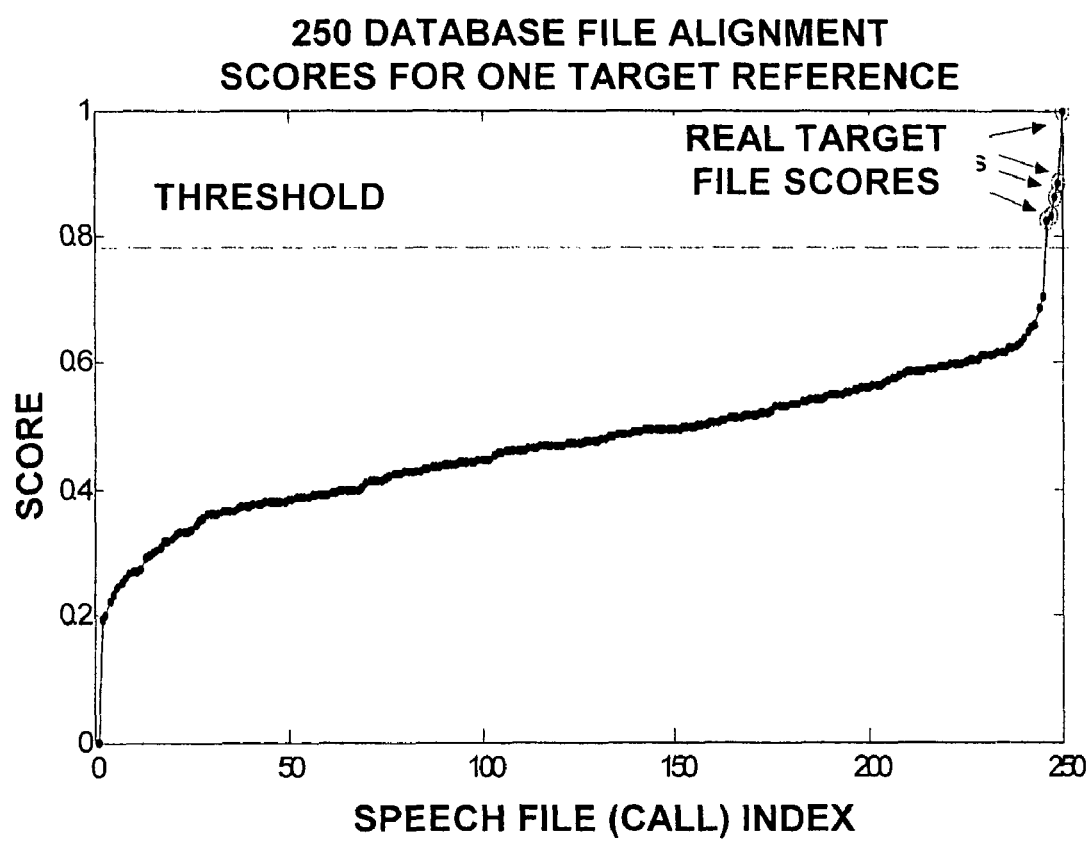
FIG. 7 shows a sorted call selection distribution graph shown by FIG. 6 during the Speaker Spotting Experiment.
Figure 8:
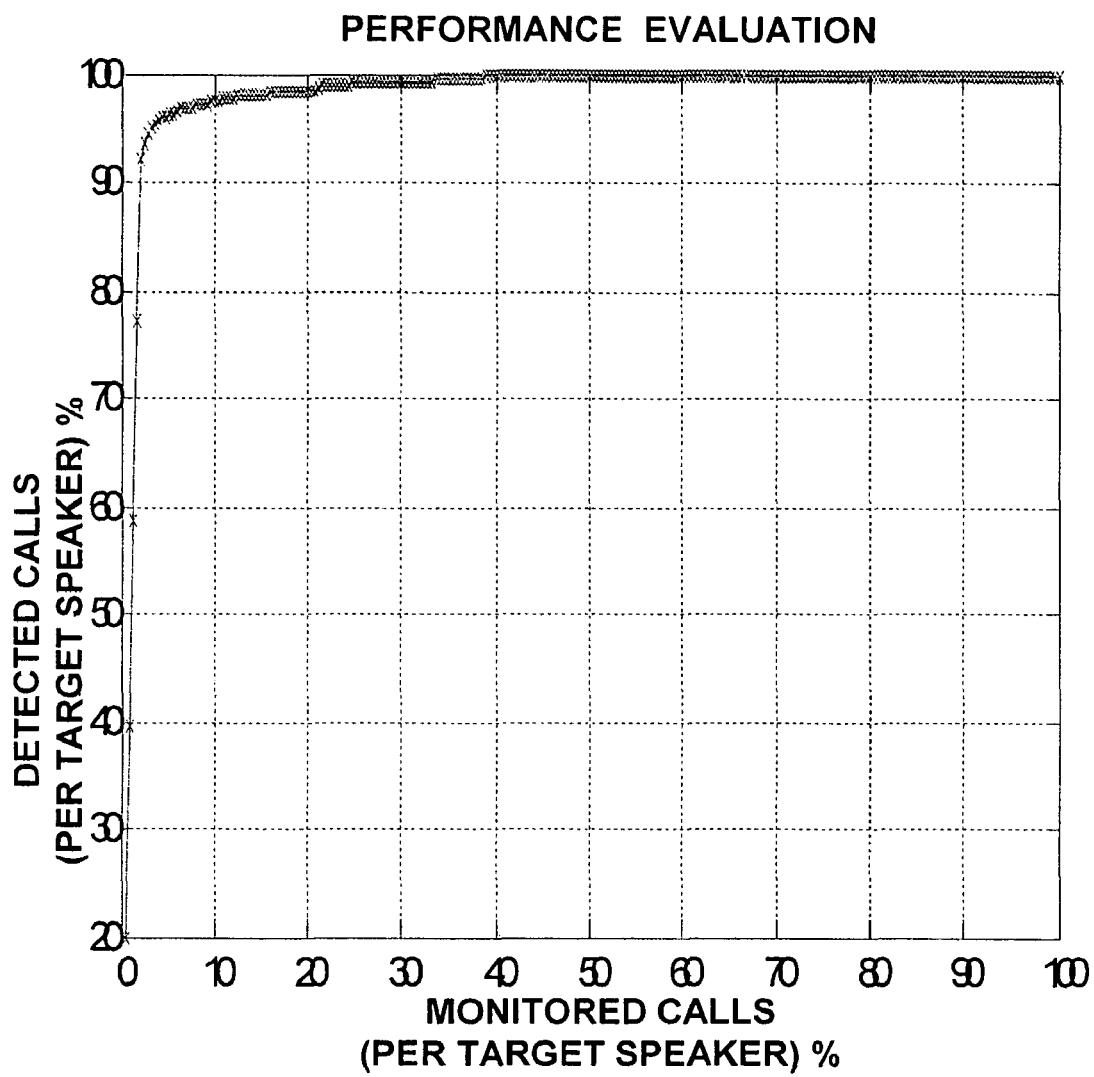
FIG. 8 shows a graph representing the performance evaluation of the system during the Speaker Spotting Experiment.

The performance of the proposed speaker spotting apparatus and method was tested by using a specific experiment involving the operation of the above described apparatus and method. The experiment will be referred to herein under as the Speaker Spotting Experiment (SPE). The SPE represents an exemplary embodiment enabling the apparatus and method of the present invention. The experimental database used in the SPE was based on recordings of telephone conversations between customers and call-center agents. The database consisted of 250 one-sided (un-summed) calls of 50 target (hidden) speakers where each speaker participated in 5 calls. Each one of the 250 speech files was the reference to one speaker spotting test, where the search was performed on all the 250 speech files. A total of 250 tests have been performed. FIGS. 6, 7 and 8 demonstrate the results of the Speaker Spotting Experiment.

Figure 9:
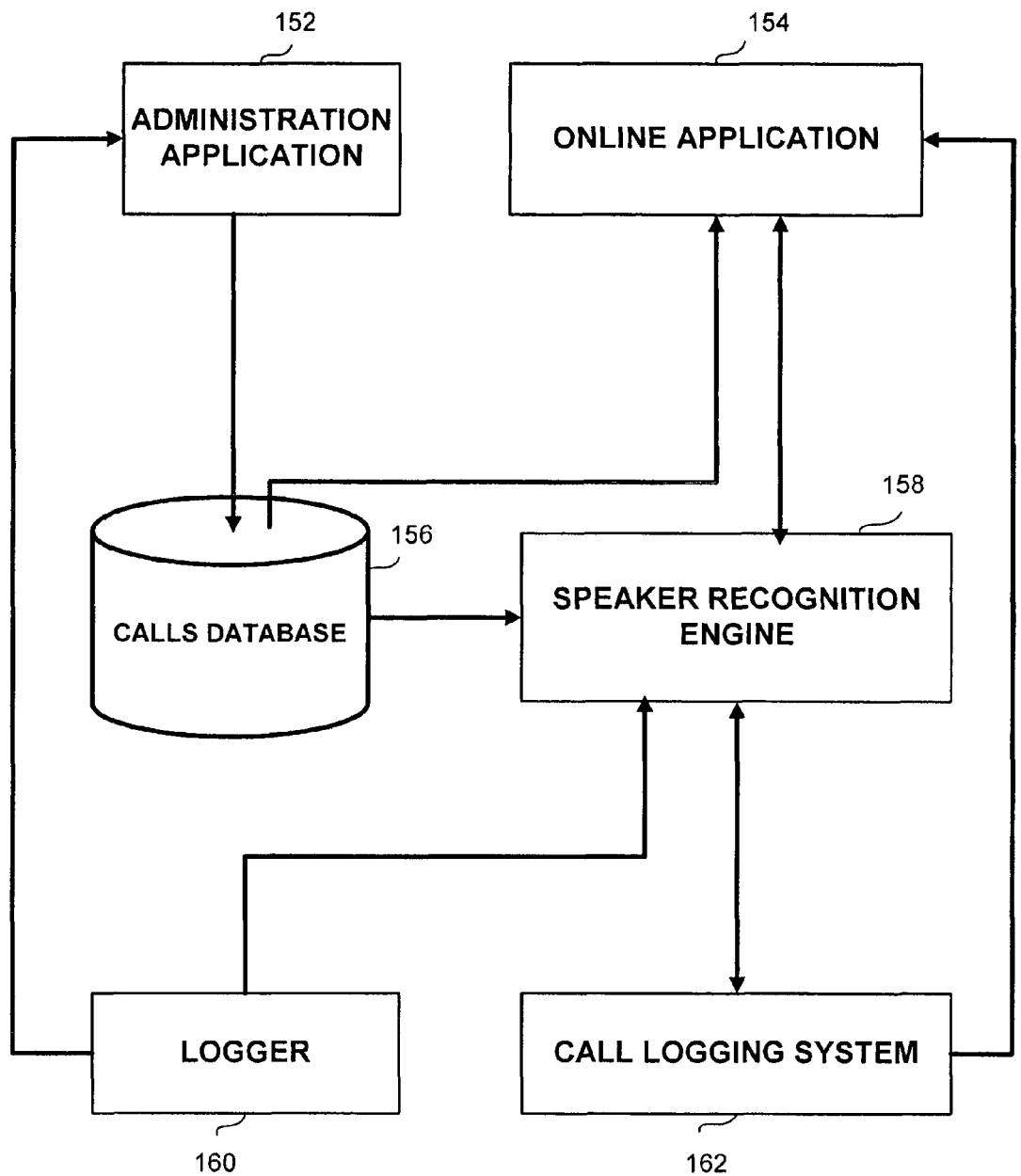
FIG. 9 is a simplified block diagram describing the components of the Speaker Spotting apparatus operating in real-time mode.

FIG. 6 shows the 250 database file scores for one target reference. Real target file scores are represented as black dots within white circles, while non-target file scores are represented by black dots without white circles. The Y-axis represents the score value while the X-axis is the speech file (call) index. The calls are shown in random order. FIG. 7 shows the 250 database file alignment scores for one target reference. As on FIG. 6 real target file alignment scores are represented as black dots within white circles, while non-target file scores are represented by black dots without white circles. The Y-axis contains the score value while the X-axis is the speech file (call) index. The calls are shown in a sorted order. The performance evaluation is shown in FIG. 8. The percentage of the detected calls (per target speaker) is shown on the Y-axis versus the percentage of the monitored calls (per target speaker) shown on the X-axis. Referring now to FIG. 9 an exemplary speaker spotting system operating in an "online mode" could include a calls database 156, a logger 160, a call logging system 162, an administration application 152, an online application 154, and a speaker recognition engine 158. The online application 154 is a set of logically inter-related computer programs and associated data structure implemented in order to perform a specific task, such as banking transactions management, security surveillance, and the like. Online application 154 activates the speaker recognition engine 158 in order to perform speaker model building and speaker spotting in real-time where the results are utilized by the application 154. Speaker recognition engine 158 is practically equivalent in functionality, structure and operation to the speaker spotting method described herein above. Speaker recognition engine 158 is coupled to a calls database 158, a logger 160, and a call logging system 162. Engine 158 utilizes the calls database 156 for the generation of the speaker models. During the search for a target speaker the engine 158 utilizes all the call recording, and logging elements of the system.

Figure 10:
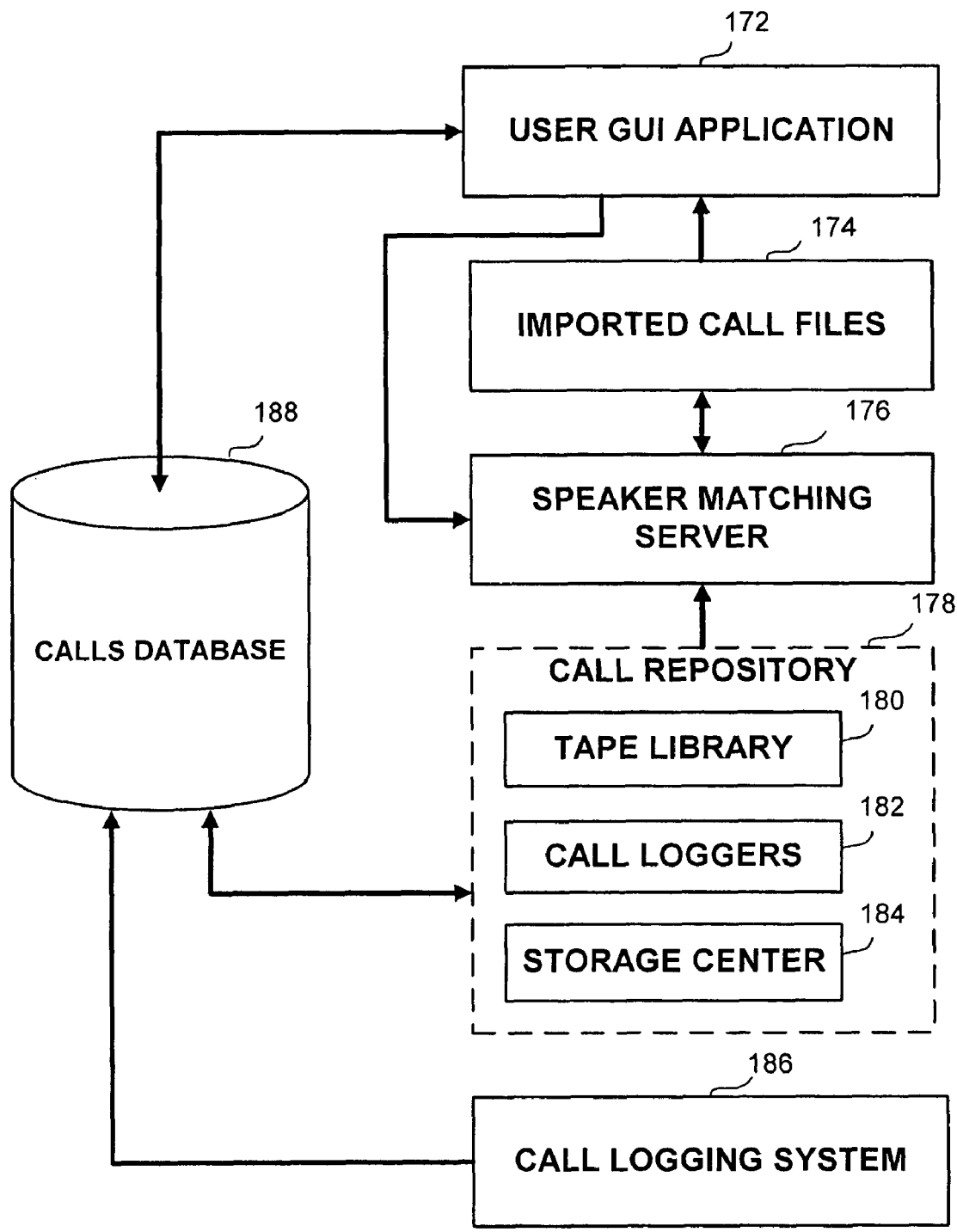
FIG. 10 is a simplified block diagram describing the components of the Speaker Spotting apparatus operating in off-line mode.

Referring now to FIG. 10 an exemplary speaker spotting system operating in an "offline mode" could include a calls database 188, a user GUI application 172, imported call files 174, a speaker matching server 176, a call repository 178, and a call logging system 186. The call repository includes a tape library 180, call loggers 182, and a storage center 184. The user GUI application 172 is a set of logically inter-related computer programs and associated data structure implemented in order to perform a specific task, such as banking transactions management, security surveillance, and the like.

Application 172 activates the speaker matching server 176 in order to provide for the spotting of a specific speaker. Server 176 utilizes the call repository 178 in order to generate speaker models and in order to spot a target speaker. Call logging system 186 obtains calls and inserts the calls into the calls database 188. Application 172 is capable of accessing call database 188 in order to extract and examine specific calls stored therein.

It will be appreciated by persons skilled in the art that the present invention is not limited to what has been particularly shown and described hereinabove. Rather the scope of the present invention is defined only by the claims which follow.

We claim:

1. A computerized method for spotting an at least one call interaction out of a multiplicity of call interactions, in which an at least one target speaker participates, the method comprising:

capturing at least one target speaker speech sample of the at least one target speaker by a speech capture device;

generating by a computerized engine a multiplicity of speaker models based on a multiplicity of speaker speech samples from the at least one call interaction;

matching by a computerized server the at least one target speaker speech sample with speaker models the multiplicity of speaker models to determine a target speaker model;

determining a score for each call interaction of the multiplicity of call interactions according to a comparison between the target speaker model and the multiplicity of speaker models; and based on scores that are higher than a predetermined threshold, determining call interactions, of the multiplicity of call interactions, in which the at least one target speaker participates.

2. The method of claim 1 wherein the step of generating comprises obtaining the at least one speaker speech sample from a multi-speaker speech database.

3. The method of claim 1 wherein the step of generating further comprises pre-processing the at least one target speaker speech sample; and extracting an at least one feature vector from the at least one speaker speech sample.

4. The method for claim 1 wherein the step of searching further comprises pre-processing the at least one target speaker speech sample; and extracting an at least one feature vector from the at least one target speaker speech sample.

5. The method according to claim 3 or claim 4, wherein the pre-processing step comprises segmenting the at least one call interaction into speech frames; and eliminating an at least one frame including noise or silence.

6. The method of claim 1 wherein the step of generating further comprises estimating the multiplicity of speaker models based on an at least one extracted feature vector.

7. The method of claim 1 wherein the step of generating further comprises storing the multiplicity of speaker models with additional speaker data in a speaker model database.

8. The method of claim 7 wherein the additional speaker data includes an at least one pointer to the at least one target speaker speech sample or to a portion of the at least one target speaker speech sample.

9. The method of claim 1 wherein the step of searching further comprises calculating probabilistic scores.

10. The method of claim 9 further comprises sorting the probabilistic scores and obtaining a score threshold value for the matching of the at least one target speaker speech sample with a speaker model of the multiplicity of speaker models.

11. The method of claim 10 further comprising indicating speaker speech models of the multiplicity of speaker models with scores above the score threshold value.

12. The method of claim 1 wherein the step of searching further comprises inserting the at least one target speaker speech sample into a sorted calls data structure.

13. The method of claim 1 wherein the step of searching comprises a step of fast searching of the multiplicity of speaker models in order to eliminate a portion of the multiplicity of speaker models.

14. The method of claim 1 wherein the step of searching further comprises testing a quality parameter of an at least one frame within the multiplicity of call interactions or within the multiplicity of speaker speech samples, the at least one frame containing an at least one feature vector, and eliminating the at least one frame if the quality is below a predetermined threshold.

15. The method of claim 1 further comprises extracting speech characteristics of a speech sample of a speaker associated with the at least one target speaker.

16. The method of claim 1 wherein the spotting of the at least one target speaker is performed offline.

17. The method of claim 1 wherein the spotting of the at least one target speaker is performed online.

18. The method of claim 1 further comprises masking speech based interactions associated with the at least one target speaker.

19. The method of claim 1 further comprises disguising the at least one target speaker by distorting a speech pattern of the at least one target speaker.

20. The method of claim 1 further comprises finding historical speech-based interactions associated with the at least one target speaker and extracting information from the interactions.

21. The method of claim 20 further comprises displaying the historical speech-based interactions associated with the at least one target speaker and displaying with the extracted information.

22. The method of claim 1 further comprising the steps of:
determining a number of summed speakers from the at least one call interaction;
segmenting an at least one speaker from the summed target speakers of at least one call interaction using only audio information of the at least one call interaction; and
separating the at least one speaker from the summed target speakers of the at least one call interaction.

23. The method of claim 22 wherein separating the at least one speaker from the summed target speakers in the at least one call interaction is performed automatically.

24. The method of claim 22 wherein the separating of the at least one speaker from the summed target speakers in the at least one call interaction is performed manually.

25. The method of claim 1, further comprising the step of outputting at least one of the multiplicity of call interactions in which the at least one target speaker participates.

26. The method of claim 1 wherein matching the at least one target speaker speech sample with the multiplicity of speaker models comprises comparing feature vector values, extracted from the at least one target speaker speech sample, with the multiplicity of speaker models.

27. The method of claim 1, wherein matching the at least one target speaker speech sample with the multiplicity of speaker models further comprises utilizing additional information linked to the multiplicity of speaker models.

28. The method of claim 27, wherein the additional information comprises at least one of a speaker profile, case data, phone equipment data, target data, call data, a call location, or warrant data, or any combination thereof.

29. A computerized apparatus for spotting an at least one call interaction out of a multiplicity of call interactions in which a target speaker participates, the apparatus comprising:
a training computerized component configured for generating a multiplicity of speaker models based on a multiplicity of speaker speech samples from the at least one call interaction; and
a speaker spotting computerized component configured for matching the target speaker speech sample with speaker models of the multiplicity of speaker models to determine a target speaker model,
determining a score for each call interaction of the multiplicity of call interactions according to a comparison between the target speaker model and the multiplicity of speaker models, and
based on scores that are higher than a predetermined threshold, determining call interactions, of the multiplicity of call interactions, and in which the at least one target speaker participates.

30. The apparatus of claim 29 further comprises a speaker model storage component to store the multiplicity of speaker models based on the multiplicity of speaker speech samples.

31. The apparatus of claim 30 wherein the speaker model storage component comprises a speaker model database to hold the multiplicity of speaker models.

32. The apparatus of claim 29 wherein the training component comprises a speaker speech pre-processor module to pre-process an at least one speaker speech sample and an at least one speech feature vector; and an extraction module to extract the at least one speech feature vectors from the pre-processed at least one speaker speech sample.

33. The apparatus of claim 29 wherein the training component comprise a speaker model estimation module to generate at least one reference speaker model associated with an extracted at least one speech feature vector; and a speaker models database to store at least one speaker model associated with the speaker speech.

34. The apparatus of claim 33 wherein the speaker model database comprises at least one speaker models and at least one feature probability density function parameter associated with the at least one speaker speech; the at least one speaker speech sample associated with the at least one speaker model; and additional speaker information for storing speaker data.

35. The apparatus of claim 29 wherein the speaker spotting component further comprises a target speaker speech feature vectors extraction module to extract at least one target speaker speech feature vectors from the target speaker speech sample.

36. The apparatus of claim 29 wherein the speaker spotting component further comprises a score calculation component to score target speaker speech and to match the target speaker speech to the multiplicity of speaker models.

37. The apparatus of claim 29 further comprising a call logging system for capturing the target speaker speech sample or at least one of the multiplicity of call interactions.

38. The apparatus of claim 29 further comprising a calls database for storing at least one of the multiplicity of call interactions.

* * * * *